May 29, 1962 T. PENKOFF ETAL 3,036,625
CIRCUMFERENTIALLY TRAVELING TYPE TIRE CHANGING APPARATUS
Filed Aug. 19, 1959 3 Sheets-Sheet 1

INVENTOR.
THEODORE PENKOFF
BY
*Curtis, Morris & Safford*
ATTORNEYS

May 29, 1962 T. PENKOFF ETAL 3,036,625
CIRCUMFERENTIALLY TRAVELING TYPE TIRE CHANGING APPARATUS
Filed Aug. 19, 1959 3 Sheets-Sheet 2

INVENTOR.
THEODORE PENKOFF
BY
Curtis, Morris & Safford
ATTORNEYS

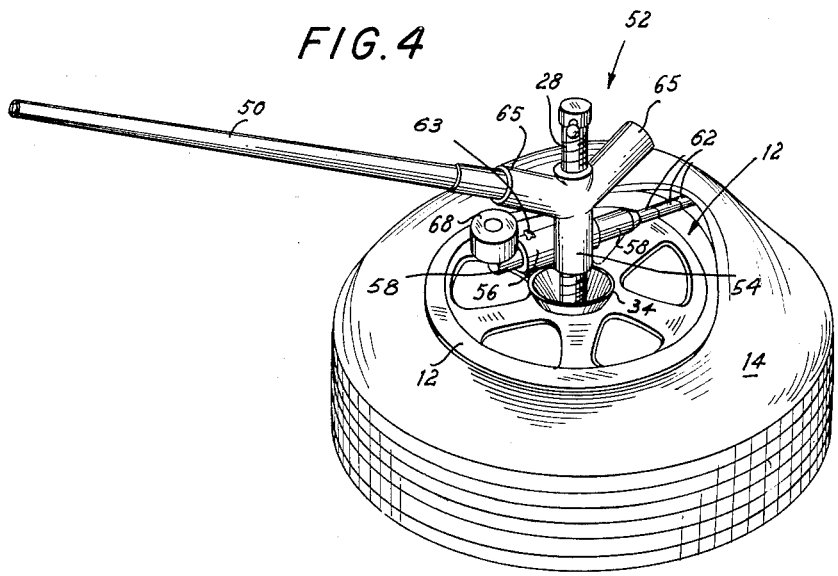
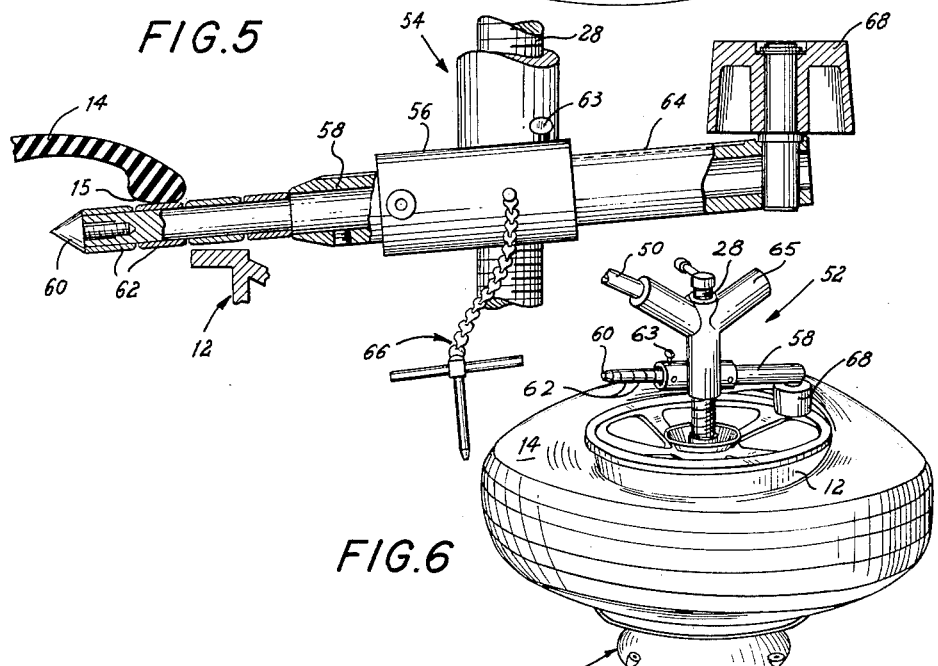

3,036,625
CIRCUMFERENTIALLY TRAVELING TYPE TIRE
CHANGING APPARATUS
Theodore Penkoff, Massapequa, and John Dineen, East
Northport, N.Y., assignors to Theodore Penkoff & Co.,
Inc., Copiague, N.Y.
Filed Aug. 19, 1959, Ser. No. 834,844
3 Claims. (Cl. 157—1.24)

This invention relates to a system and apparatus for changing tires, particularly airplane tires and the like which are mounted on one piece wheels.

An object of this invention is to simplify the removal and replacement of tires, such as airplane tires and tubeless automobile tires, which tend to adhere very tightly to the wheels on which they are mounted.

Another object of the invention is to provide apparatus which can remove and replace such tires without damage either to them or to the wheels on which they are mounted.

Another object is to provide such apparatus which is easy to use, efficient in operation and which can be manufactured at relatively modest cost.

These and other objects of the invention will in part be understood from and in part pointed out in the description given hereinafter.

Many aircraft use a standard one piece wheel which has a specially formed and tapered rim on which is mounted a closely fitting tire. The tire at each side of the wheel has a bead or edge which mates against a tapered surface on the inside of the wheel rim to give a very tight strong fit. During use a tire mounted on such a wheel tends to vulcanize itself to the rim so that they become virtually a one piece unit. This makes it very difficult to remove a tire from such a wheel. Additionally, many of these wheels and tires are very large and heavy, some weighing several hundred pounds or more, so that previously it has been a difficult and slow job to remove and replace tires on wheels of this kind.

In the past a number of devices ranging from complex automatic machines to simple hand tools have been devised for removing and replacing tires. However, these have all had shortcomings; either they were expensive to manufacture or else in operation they were inefficient and tended to exert excessive force thereyby damaging themselves, the tire or the wheel. The present invention provides a relatively inexpensive yet safe, simple apparatus and system of operation for changing these otherwise hard to remove tires.

In accordance with the present invention in one specific embodiment thereof, there is provided tire demounting and changing apparatus, a first part of which comprises a short vertical stand, which for example is rigidly bolted to the floor, and which is adapted to support a wheel and tire during the demounting and changing operation. This stand is threaded along its length and is engaged with a cone-shaped support member which contacts and centers the lower end of the wheel hub. A second part of the apparatus, comprising a T-shaped tool with relatively large diameter freely rotatable "bead breaker" rollers mounted respectively near each end of its cross arm, fits on the top of this stand. The center post of this second part is also threaded, but in opposite sense relative to the stand, and is similarly engaged with a cone-shaped support adapted to contact and center the upper end of the wheel hub. This post locks onto the top of the stand, passing vertically through the hub of a wheel, and the two cone supports being on oppositely threaded members move together and tightly clamp the wheel hub when the wheel is slightly turned in proper direction after its initial placement on the stand. With this arrangement no special wrenches or extra operations are needed in clamping the wheel rigidly onto the stand.

The "bead breaker" rollers of this T-shaped tool are laterally adjustable on their cross arm so that each can be positioned directly above the upper bead of the tire and just beyond the rim of the wheel. Then by screwing the cross arm downward on its center post, the rollers, frictionlessly rolling in contact with the tire, are gradually moved lower and lower to progressively loosen or break the grip of the bead of the tire against the rim. During this operation the rollers being diametrically on opposite sides of the wheel, together exert only a downward force and do not tend to bend or distort the wheel and support column. Since they roll freely in contact with the tire, and their area of contact with it is large, their action is very gentle and does not damage the tire.

After the top bead of the tire is loosened in this fashion, the wheel is turned over, re-clamped on the stand and the second bead is loosened in similar fashion. Now, assuming that the tire is mounted on a one piece wheel, which cannot be separated into pieces to accomplish removal of the tire, it is next necessary to lift each bead of the tire over an outer flange of the rim in order to separate tire and wheel completely. This operation is carried out with a third or "bead lifting" part of the apparatus.

This third part comprises a center post, like the center post of the second part, with a tubular bracket threaded onto it. The bracket in turn has a nearly horizontal sleeve within which is adjustably mounted a probe-like shaft on one end of which is carried concentric with its axis a series of small diameter sleeve-like rollers. This end of the shaft, after the bead of the tire is pryed over the rim flange at one point, is then inserted between them, at least one roller being beneath and bearing upward against the tire bead. This shaft is then revolved in a 360° arc around its center post thereby lifting the bead of the tire over the rim flange. In so doing there is practically no friction or abrasion against the tire and, thus, the bead of the tire is lifted over the rim with utmost ease and without damage to either. Once the upper bead has been lifted free in this fashion, the lower bead can likewise be lifted up and over the same rim flange. Now the wheel is bare and ready to receive another tire (or the same one after it has been repaired).

The mounting of a tire on a wheel is accomplished with the wheel positioned as before and using the opposite end of the "bead lifting" shaft. This opposite end has mounted on its end at right angles to it a wide, slightly tapered roller which, upon swinging the shaft in a 360° arc, progressively pushes the bead of the tire over and beneath the irm.

A better understanding of the invention together with a full appreciation of its many advantages will best be understood from the following description given in connection with the accompanying drawings wherein:

FIGURE 4 is similar to FIGURE 3 but shows the end of the tool inserted under the bead of the tire prior to lifting this bead over the rim flange all the way around;

FIGURE 5 is an enlarged view from the opposite side of FIGURE 4 showing the details of construction of the "bead-lifting" shaft; and FIGURE 6 shows the "bead-lifting" tool positioned to re-mount a tire on a wheel.

Figure 1:
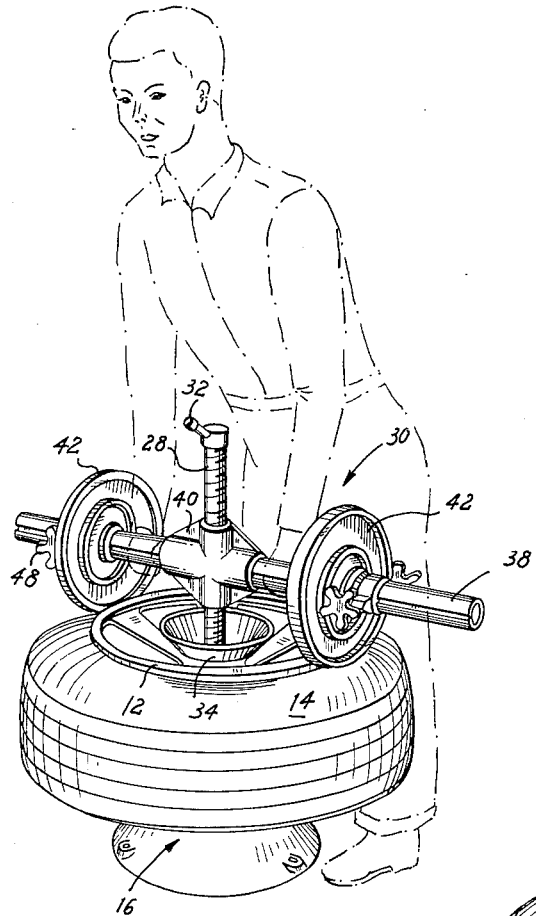
FIGURE 1 is a perspective view of tire changing apparatus provided according to the invention, the stand and "bead breaking" tool being shown.
Figure 2:
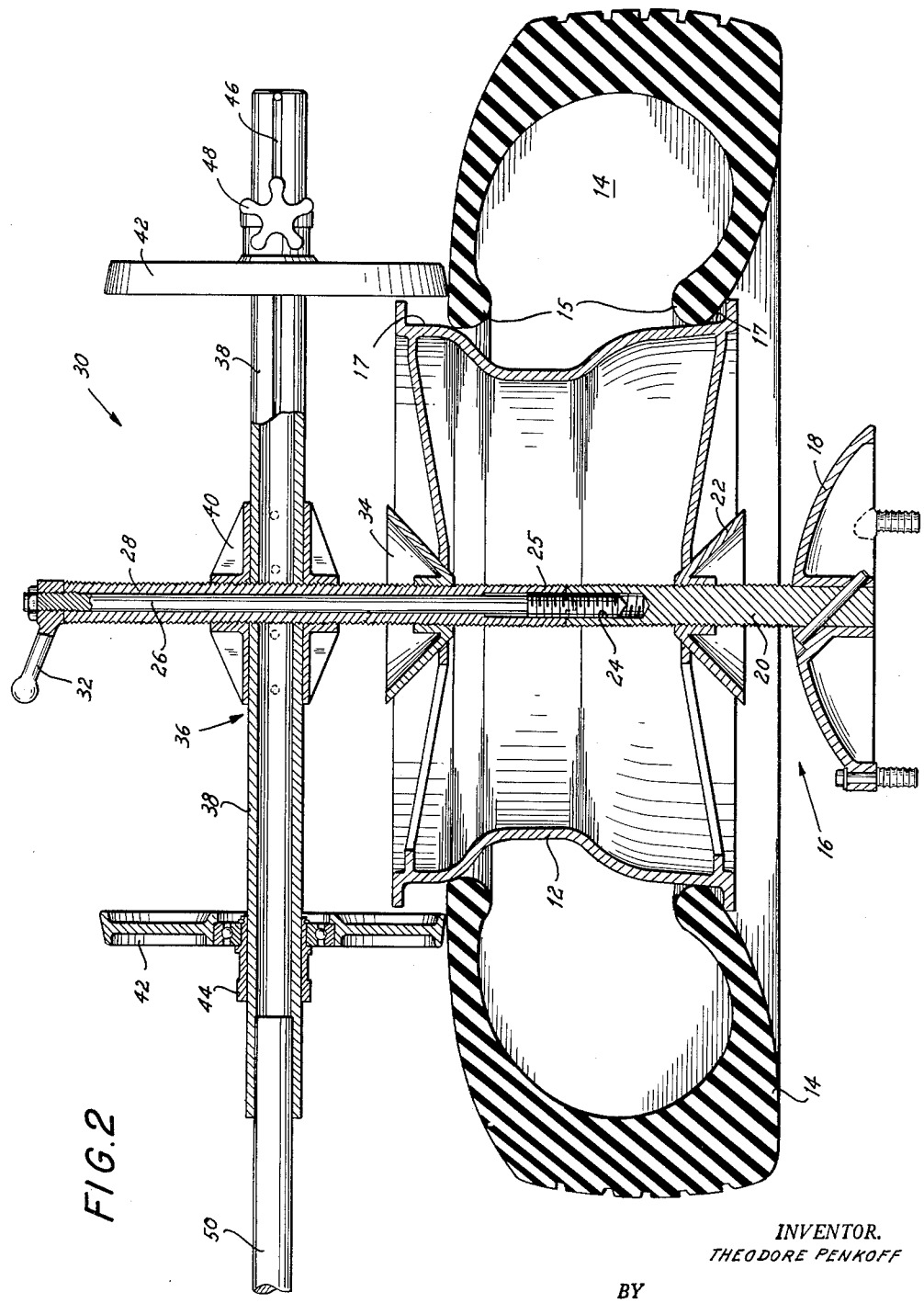
FIGURE 2 is an enlarged cross-section of the tool and wheel shown in FIGURE 1, the first or lower bead of the tire having already been loosened and the upper bead almost loosened.

As seen in FIGURE 1 and in enlarged detail in FIGURE 2, a typical one piece airplane wheel 12 having mounted on it a tire 14, with inner edges or beads 15, is horizontally positioned with its hub supported on a stationary stand generally indicated at 16. The wheel where it engages these beads at its outer rim 17 is slightly tapered outward in diameter so that they tend to wedge themselves tightly onto the wheel. Stand 16 comprises a base 18 bolted to the floor, and a vertical post 20 whose lower end is rigidly fixed within the base. Post 20 is threaded along its length with a right thread and is engaged at a convenient height above the floor by a cone-shaped member 22, the lower end of the hub of wheel 12 resting upon and being centered by cone 22. The upper end of post 20 is internally threaded at 24 and engages a threaded, projecting end 25 of a bolt 26 extending internally the length of a threaded post 28. The latter comprises the central post for a "bead-breaking" tool, generally indicated at 30. Post 28 is rigidly joined to lower post 20 by bolt 26, the upper end of this bolt terminating in a handle 32 by means of which the two posts can either be quickly separated or screwed tightly together as shown. Engaged on post 28, which is left-threaded along its length, is a cone-shaped member 34 which contacts and centers the upper end of the wheel hub. Once cones 22 and 34 are engaged against the hub, counter-clockwise rotation of wheel 12 as seen looking down in FIGURES 1 and 2 will screw them closer together, each cone being on an oppositely threaded post, thereby tightly clamping the wheel onto stand 16. The mechanical advantage obtained by rotating wheel 12 rather than the cones directly makes much easier the task of clamping the wheel in place. Also, slippage and wear between the cones and the wheel is minimized.

Threaded onto the upper part of post 28 is a cross arm 36 having a two piece tubular axle 38 joined together by a cast bracket or coupling 40 with internal threads engaging post 28 at right angles to axle 38. Near each outer end of the axle is adjustably positioned a large diameter (viz., eight inches) "bead-breaking" roller 42. Each roller as seen in FIGURE 2 is relatively thin with a slanted rim, and each is mounted on a bearing assembly 44 which can be slid laterally along a groove 46 on axle 38 and clamped in a desired position by a knob 48. With each roller positioned just beyond the edge of the wheel rim, a handle bar 50 is inserted in one end of arm 36 and it is revolved counter-clockwise on post 28. This simultaneously carries rollers 42 around the upper tire bead and moves them gradually downward thereby progressively forcing the tire bead loose from the wheel rim. After both beads have been broken, the tire is ready to be lifted off of the wheel.

Figure 3:
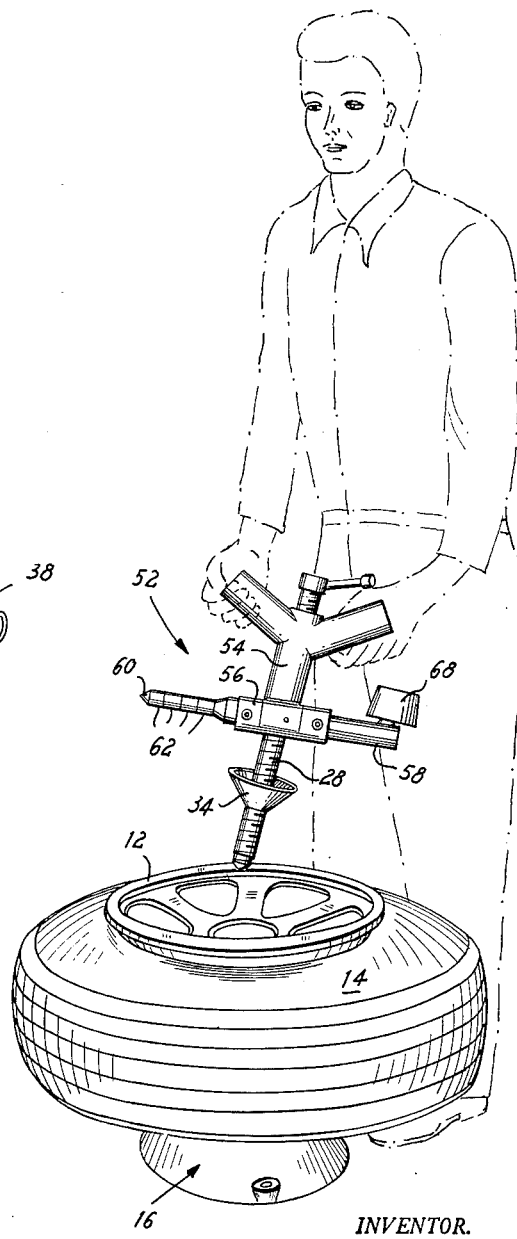
FIGURE 3 is a perspective view similar to FIGURE 1 but shows the "bead-lifting" tool being placed in position.

De-mounting of the tire is begun by replacing the "bead-breaking" tool 30 with a "bead-lifting" tool shown in FIGURES 3 and 4 and generally indicated at 52. This tool includes certain elements which are identical to corresponding ones of tool 30, and which accordingly have been given the same reference numbers, namely, post 28, bolt 26, cone 34 and handle 32. Threaded on post 28 of tool 52 is a tubular bracket 54, the lower end of which as seen in FIGURE 5 comprises a nearly horizontal sleeve 56. Slidably mounted in this sleeve is a shaft 58 having a pointed front end 60 behind which are mounted a series of small concentric rollers 62 (four being shown). Shaft 58 is held from turning in sleeve 56 by a thumb screw 63 which engages a groove 64 along the shaft. The upper part of bracket 54 comprises two sockets 65 in either of which can be inserted handle bar 50 for revolving the bracket around post 28, as described below.

After tool 52 has been fastened onto stand 16 with the wheel clamped between cones 22 and 34, a previously loosened bead of the tire as shown in FIGURE 4 is pried over the wheel rim (for example, by an auxiliary tire iron, not shown) and the forward end of shaft 58 is inserted under the bead. Then the shaft, see FIGURE 5, is locked to sleeve 56 by a thumb screw 63 so that one roller 62 stays approximately ¼ inch from the rim of wheel 12 and another roller bears against the tire. With the tool arranged as shown in FIGURES 4 and 5, it is then rotated by bar 50 360° around post 28 thus quickly and easily lifting the bead of the tire over the rim all the way around. If desired, a lubricant such as water and soap can be used to make this operation even easier. After the upper tire bead has been lifted over the wheel rim, the lower bead can be lifted up and over the same way.

As seen in FIGURE 5, the rear end of shaft 58 carries a wide, somewhat tapered roller 68 mounted at right angles to the shaft and with its rim projecting beyond the shaft end. A series of holes for receiving a pin 66 (see FIGURE 5) are provided in shaft 58 so that it can be properly positioned along sleeve 56 to accommodate different diameter wheels. Thus, as shown in FIGURE 6 with the shaft positioned so that roller 68 is turned down and projects outward against the bead of a tire, simply by rotating the tool 360° the tire bead is forced over and under the wheel rim.

The drawings herein were made from photographs and show the tools and elements of this apparatus substantially to scale.

It will now be appreciated that the tire de-mounting and changing apparatus provided according to the invention is relatively simple and inexpensive. Even so, its action is very effective yet gentle. During the "bead-breaking" and "bead-lifting" operations the major forces are exerted on the central hub of the wheel, which is designed to stand heavy loads, rather than concentrated at a particular point on the rim of the wheel. Because the various tools primarily roll in contact with the tire, the danger of pinching or tearing it is reduced to a minimum. By comparison with the operation of changing a heavy tire such as illustrated using a conventional tire iron and hammer, which operation may take two men an hour or more, two men using the apparatus according to the invention can change the same tire in fifteen minutes or so, and with a lot less effort.

The above description is intended in illustration and not in limitation of the invention. Various minor changes and modifications in the system and apparatus illustrated may occur to those skilled in the art and these may be made without departing from the spirit or scope of the invention as set forth.

We claim:

1. Improved apparatus for changing a tire comprising a stand having a first externally threaded post, a support threaded onto said first post adapted to engage the lower side of the hub of a wheel with a tire to be removed, and a tool for operating on the tire in the course of mounting and removing it, said tool including a second post externally threaded along its length, a second support threaded onto said second post and adapted to engage the upper side of the wheel hub and to clamp it tightly against said first support, quick connect and disconnect means carried by said second post for removably engaging said first post endwise, and a tool bracket rotatably mounted on said second post above said second support, said second post being co-axial with the first post and threaded along its length counter to the threading along said first post, whereby rotation of said wheel in one direction clamps said supports against said hub and rotation in the opposite direction unclamps said supports.

2. Apparatus as in claim 1 wherein said cross-arm is a shaft laterally shiftable in said bracket, one end of said shaft being probe-like and having at least one small diameter roller on said shaft near its end and concentric with its axis, said roller being adapted to rotate in contact underneath the bead of a tire and to lift it up over the rim of said wheel all the way around.

3. Improved apparatus for changing a tire comprising a stand having a first externally threaded post, a support threaded onto said first post adapted to engage the lower side of the hub of a wheel with a tire to be removed, and a tool for operating on the tire in the course of mounting and removing it, said tool including a second post externally threaded along its length, a second support threaded onto said second post and adapted to engage the upper side of the wheel hub and to clamp it tightly against said first support, quick connect and disconnect means carried by said second post for removably engaging said first post endwise, a tool bracket rotatably mounted on said second post above said second support, said tool bracket having two opposed sockets forming in conjunction with the upper body of said bracket a Y-shaped body, said bracket having a sleeve mounted on one side of said body at the lower end thereof, and a cross-arm tire changing tool splined in said sleeve and fixable thereto by a pin, said second post being co-axial with the first post and threaded along its length counter to the threading along said first post, whereby rotation of said wheel in one direction clamps said supports against said hub and rotation in the opposite direction unclamps said supports.

References Cited in the file of this patent

UNITED STATES PATENTS

| | | |
|---|---|---|
| 1,451,344 | Robinett | Apr. 10, 1923 |
| 1,720,614 | Welch | July 9, 1929 |
| 1,974,021 | Gibson | Sept. 18, 1934 |
| 2,201,982 | Bazarck | May 28, 1940 |
| 2,569,789 | Weaver | Oct. 2, 1951 |
| 2,652,078 | Rockwell | Sept. 15, 1953 |
| 2,693,228 | Rockwell | Nov. 2, 1954 |

FOREIGN PATENTS

| | | |
|---|---|---|
| 811,659 | Germany | Aug. 21, 1951 |